(12) United States Patent
Torisaka et al.

(10) Patent No.: US 8,250,859 B2
(45) Date of Patent: Aug. 28, 2012

(54) EXHAUST EMISSION CONTROL DEVICE

(75) Inventors: Hisaki Torisaka, Hino (JP); Minoru Kowada, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 268 days.

(21) Appl. No.: 12/529,929

(22) PCT Filed: Mar. 14, 2008

(86) PCT No.: PCT/JP2008/000592
§ 371 (c)(1),
(2), (4) Date: Sep. 4, 2009

(87) PCT Pub. No.: WO2009/016781
PCT Pub. Date: Feb. 5, 2009

(65) Prior Publication Data
US 2010/0018188 A1    Jan. 28, 2010

(30) Foreign Application Priority Data
Aug. 2, 2007  (JP) ................................. 2007-201488

(51) Int. Cl.
*F01N 3/035* (2006.01)
(52) U.S. Cl. ................... 60/295; 60/297; 60/301
(58) Field of Classification Search .............. 60/286, 60/295–297, 301
See application file for complete search history.

(56) References Cited

U.S. PATENT DOCUMENTS
2002/0073696 A1    6/2002  Kuenstler et al.
2004/0261404 A1   12/2004  Vignassa et al.
2006/0153748 A1 *  7/2006  Huthwohl et al. ............ 422/172
2008/0066451 A1 *  3/2008  Warner et al. ................... 60/286
2008/0092526 A1    4/2008  Kunkel et al.

FOREIGN PATENT DOCUMENTS

| GB | 2 381 218 A | 4/2003 |
|---|---|---|
| JP | 2004 108221 | 4/2004 |
| JP | 2005 155404 | 6/2005 |
| JP | 2006 320854 | 11/2006 |
| JP | 2007 40149 | 2/2007 |
| JP | 2008 208726 | 9/2008 |
| JP | 2008 208761 | 9/2008 |
| WO | WO 03/071104 A1 | 8/2003 |
| WO | WO 2006/014129 A1 | 2/2006 |
| WO | WO 2006/087541 A1 | 8/2006 |

OTHER PUBLICATIONS

Supplementary European Search Report issued Feb. 18, 2011, in Application No. EP 08 72 0478.
U.S. Appl. No. 12/678,498, filed Mar. 17, 2010, Torisaka, et al.
U.S. Appl. No. 12/529,024, filed Aug. 28, 2009, Endo, et al.

* cited by examiner

*Primary Examiner* — Thomas Denion
*Assistant Examiner* — Jonathan Matthias
(74) *Attorney, Agent, or Firm* — Oblon, Spivak, McClelland, Maier & Neustadt, L.L.P.

(57) ABSTRACT

An exhaust emission control device is disclosed. The exhaust emission control device includes a particulate filter incorporated in an exhaust pipe to capture particulates in exhaust gas, a selective reduction catalyst arranged downstream of the particulate filter to selectively react $NO_x$ with ammonia, even in the presence of oxygen, and urea water addition means capable of adding urea water as reducing agent between the catalyst and the filter. The urea water addition means is arranged at an upstream end of a longest linear portion. At least one bend is formed in a passage which guides the exhaust gas from the urea water addition means to the selective reduction catalyst.

14 Claims, 2 Drawing Sheets

EXHAUST EMISSION CONTROL DEVICE

TECHNICAL FIELD

The present invention relates to an exhaust emission control device.

BACKGROUND ART

Conventionally, some diesel engines have selective reduction catalyst incorporated in an exhaust pipe through which exhaust gas flow, said catalyst having a feature of selectively reacting $NO_x$ with a reducing agent even in the presence of oxygen. A required amount of reducing agent is added upstream of the reduction catalyst and is reacted on the catalyst with $NO_x$ (nitrogen oxides) in the exhaust gas to thereby reduce a concentration of the discharged $NO_x$.

In a field of industrial plant or the like with flue-gas denitration, it has been well known that ammonia ($NH_3$) is effectively used as reducing agent to depurate $NO_x$ through reduction. However, for automobiles, safety in carrying ammonia itself during running is difficult to ensure, so that in recent years, use of nontoxic urea water as reducing agent has been researched.

More specifically, when urea water is added to the exhaust gas upstream of the selective reduction catalyst, the urea water is decomposed into ammonia and carbon dioxide gas according to the following equation to thereby depurate $NO_x$ well in the exhaust gas through reduction by ammonia on the catalyst.

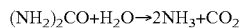

$$(NH_2)_2CO + H_2O \rightarrow 2NH_3 + CO_2$$

For exhaust emission control of the diesel engine, mere removal of $NO_x$ in the exhaust gas is insufficient; particulates (particulate matter) in the exhaust gas must be captured through a particulate filter. This kind of particulate filter employed requires to be timely regenerated by burning off the particulates to prevent increase of exhaust resistance due to clogging.

To this end, it has been conceived to additionally arrange flow-through type oxidation catalyst in front of the particulate filter; with accumulation of the particulates becoming increased, fuel is added to the exhaust gas upstream of the oxidation catalyst to forcibly regenerate the particulate filter.

More specifically, the fuel is added to the exhaust gas upstream of the oxidation catalyst to bring about oxidation reaction of the added fuel (HC) during passing of the added fuel through the oxidation catalyst. The exhaust gas elevated in temperature by the reaction heat of the oxidation flows into the particulate filter arranged just behind so that temperature of a catalyst floor of the particulate filter is elevated to burn off the particulates, thereby attaining the regeneration of the particulate filter.

As actual measures for carrying out the above-mentioned fuel addition, it has been generally conceived that main injection of the fuel near a compression upper dead center is followed by post injection at non-ignition timing after the compression upper dead center so as to add the fuel to the exhaust gas. For effective utilization of the added fuel in forced regeneration of the catalyst and in order to conduct oxidization treatment of the added fuel before substantial lowering in temperature of the exhaust gas, it has been conceived preferable to arrange the particulate filter upstream of the selective reduction catalyst.

There are, for example, the following Patent Literature 1 and the like as prior art references referring to this kind of exhaust emission control device.

[Patent Literature 1] Japanese Patent Application No. 2007-043492

[Patent Literature 2] Japanese Patent Application No. 2007-045583

SUMMARY OF INVENTION

Technical Problems

However, such arrangement of the particulate filter upstream of the selective reduction catalyst brings about addition of urea water between the particulate filter and the selective reduction catalyst, so that reaction on the exhaust gas cannot be properly conducted until the urea water is hydrolyzed into ammonia and carbon dioxide gas.

The invention was made in view of the above and has its object to provide an exhaust emission control device wherein urea water added to exhaust gas is properly hydrolyzed into ammonia before it reaches selective reduction catalyst.

Solution to Problems

The invention is directed to an exhaust emission control device having a particulate filter incorporated in an exhaust pipe for capturing particulates in exhaust gas, a selective reduction catalyst downstream of said particulate filter and capable of selectively reacting $NO_x$ with ammonia even in the presence of oxygen and urea water addition means capable of adding urea water as reducing agent between said selective reduction catalyst and said particulate filter, characterized in that at least a bend is formed in a flow passage for guidance of the exhaust gas from said urea water addition means to the selective reduction catalyst.

Thus, in this way, by forming the one or more bends in the flow passage for guidance of the exhaust gas from the urea water addition means to the selective reduction catalyst, the urea water collides at the bend or bends to bring about refinement in liquid particle size of the urea water and thus effective mixing of the exhaust gas with the urea water, resulting in proper hydrolysis of the urea water into ammonia in the exhaust gas.

In the invention, when the urea water addition means is arranged at an upstream end of a longest linear portion in the flow passage for guidance of the exhaust gas from the particulate filter to the selective reduction catalyst and the linear portion has length enough for obtaining reaction time for conversion of the urea water into ammonia, the urea water is mixed with the exhaust gas in the linear portion so that conversion into ammonia begins and further the urea water not successfully converted into ammonia becomes refinement in size at the bend or bends for facilitation of the reaction, thereby conducting further properly the reaction of the urea water against the exhaust gas.

Upon carrying out the invention more concretely, it is preferable that the particulate filter and the selective reduction catalyst are arranged side by side and the flow passage of the exhaust gas comprises a first connection for fold-back of the exhaust gas discharged from a rear of the particulate filter, a linear portion extending from the first connection toward a front of the selective reduction catalyst and a second connection with a bend or bends for guidance of the exhaust gas from the linear portion to the front of the selective reduction catalyst.

Further, it is preferable in the invention that an oxidation catalyst for oxidation treatment of unburned fuel in the exhaust gas is arranged just in front of the particulate filter, fuel addition means for addition of fuel in the exhaust gas being arranged upstream of the oxidation catalyst; thus, the fuel added by the fuel addition means is oxidized on the oxidation catalyst, so that inflow of the exhaust gas elevated in temperature by reaction heat of the oxidization elevates the catalytic floor temperature of the particulate filter just behind to burn off the particulates, thereby attaining regeneration of the particulate filter.

In this case, a fuel injection device for injection of fuel to respective cylinders of the engine may be employed as fuel addition means, the fuel addition being carried out in such a manner that the fuel injection to the cylinders is controlled to leave much unburned fuel in the exhaust gas.

Moreover, it is preferable in the invention that an ammonia reducing catalyst is arranged just behind the selective reduction catalyst so as to oxidize surplus ammonia; then, ammonia surplus in use of the reduction reaction in the selective reduction catalyst is oxidized in the ammonia reducing catalyst arranged just behind.

Advantageous Effects of Invention

According to the above-mentioned exhaust emission control device of the invention, a variety of excellent effects and advantages as mentioned below can be obtained.

(I) According to the invention, the urea water collides at the bend or bends to bring about refinement in liquid particle size of the urea water, so that the reaction of the urea water to the exhaust gas can be properly conducted.

(II) According to the invention, the fuel added by the fuel addition means can be oxidized on the oxidation catalyst and the inflow of the exhaust gas elevated in temperature by reaction heat of the oxidization can elevate the catalytic floor temperature of the particulate filter just behind to burn off the particulates, thereby attaining positive regeneration of the particulate filter.

(III) According to the invention, surplus ammonia having passed through the selective reduction catalyst without reaction can be oxidized to become harmless. As a result, ammonia can be prevented from being left in the exhaust gas to be finally discharged into the air.

Figure 1:
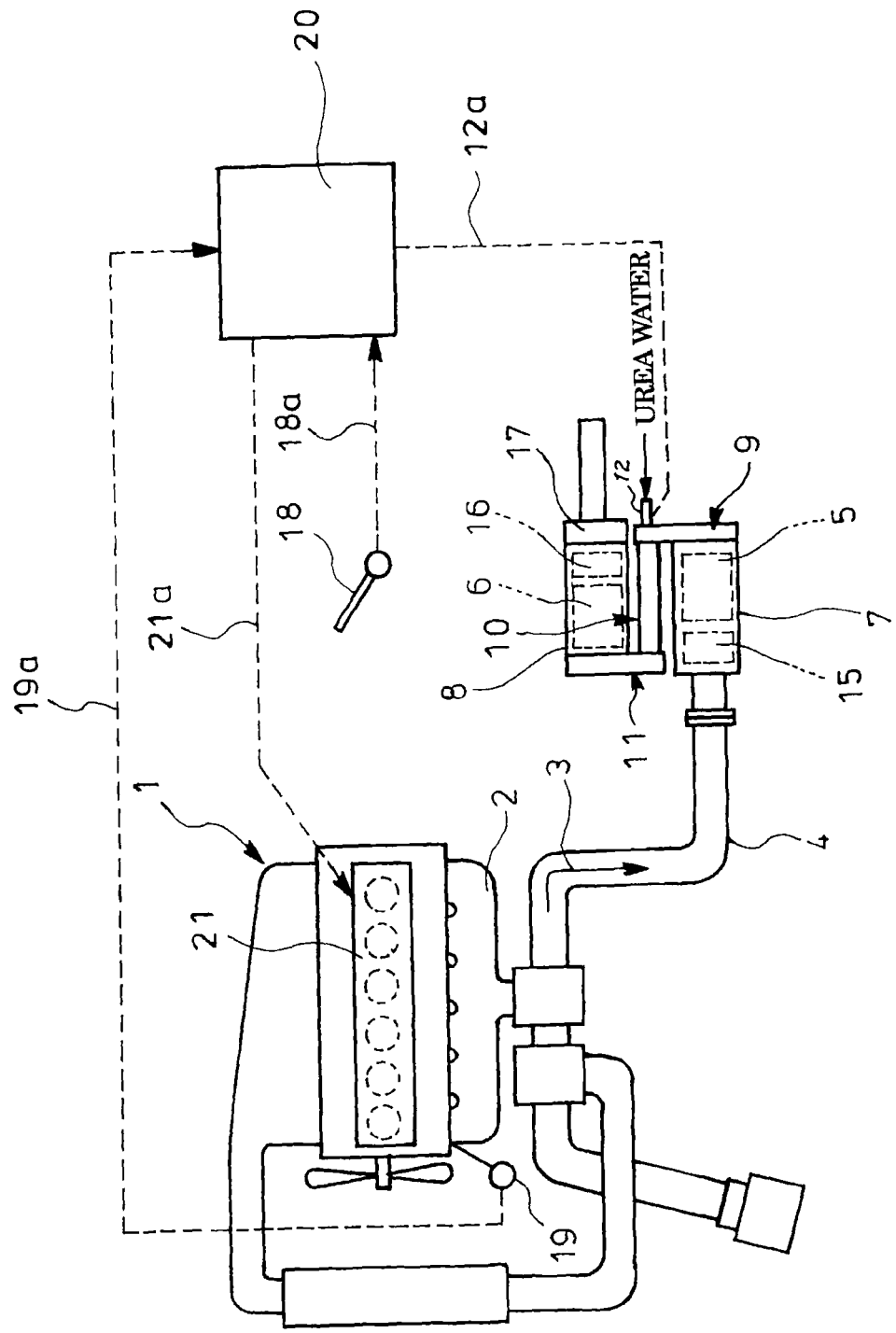
FIG. 1 is a schematic view showing an embodiment of the invention.

REFERENCE SIGNS LIST 1 diesel engine (engine)
3 exhaust gas
4 exhaust pipe
5 particulate filter
6 selective reduction catalyst
9 first connection
10 linear portion
10a upstream end
10b downstream end
11 second connection
12 urea water addition injector (urea water addition means)
13 first bend
14 second bend
15 oxidation catalyst
16 ammonia reducing catalyst
21 fuel injection device (fuel addition means)

DESCRIPTION OF EMBODIMENT

An embodiment of the invention will be described in conjunction with drawings.

FIG. 1 shows the embodiment of the invention. In the exhaust emission control device of the embodiment, a particulate filter 5 for capture of particulates in exhaust gas 3 and a selective reduction catalyst 6 with a property capable of selectively reacting $NO_x$ with ammonia even in the presence of oxygen are encased by casings 7 and 8, respectively, and are incorporated side by side in an exhaust pipe 4 through which the exhaust gas 3 from a diesel engine 1 flows via an exhaust manifold 21.

Figure 2:
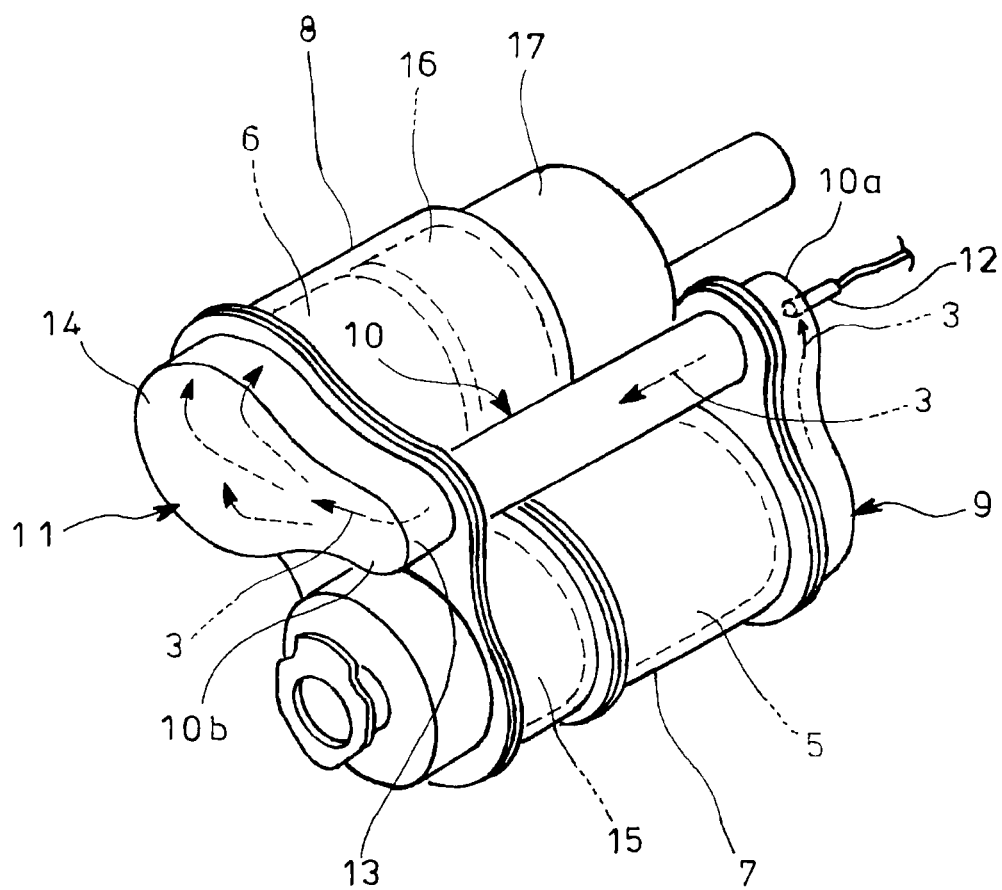
FIG. 2 is a perspective view showing, in enlarged scale, important parts in FIG. 1.

A flow passage of the exhaust gas 3 for connection of the casings 7 and 8 comprises, as shown in FIGS. 1 and 2, a first connection 9 for fold-back of the exhaust gas 3 just discharged from the rear of the particulate filter 5, a linear portion 10 extending from the rear of the first connection 9 toward the front of the selective reduction catalyst 6 for transportation of the exhaust gas 3 folded back at the first connection 9 to the selective reduction catalyst 6 and a second connection 11 for connection between the linear portion 10 and the selective reduction catalyst 6 for guidance of the exhaust gas 3 from the linear portion 10 to the front of the selective reduction catalyst 6.

The linear portion 10 has an upstream end 10a at which urea water addition injector 12 (urea water addition means) is arranged for addition of urea water as reducing agent between the particulate filter 5 and the selective reduction catalyst 6. The linear portion 10 is a longest linear portion of the flow passage for guidance of the exhaust gas 3 from the particulate filter 5 to the selective reduction catalyst 6 and has length (more than 700 mm from the upstream end 10a of the linear portion 10 to the inlet of the selective reduction catalyst 6) enough for mixing and reaction time for conversion of the urea water into ammonia. The linear portion 10 may be an ordinary pipe or may be a mixing pipe. The urea water addition injector 12 (urea water addition means) may be air-assisted type such that the addition of the urea water is assisted by pressurized air or may be airless type with no assisting means by air; in the case of air-assisted type, an air supplying construction is required so that disadvantageously the cost is increased as a weight of a vehicle is increased.

On the other hand, in order to provide at least a bend in the flow passage from the urea water addition injector 12 to the selective reduction catalyst 6, the second connection 11 has a first bend 13 curved at a tip of the linear portion 10 and a second bend 14 which curves further from the first bend 13 and is connected to the front (casing 8) of the selective reduction catalyst 6. In this connection, it is preferable that each of the bends 13 and 14 is not greatly curved but has a great curvature radius to provide a softly curved surface.

Moreover, particularly in the embodiment, arranged in the casing 7 and in front of the particulate filter 5 is oxidation catalyst 15 for oxidization treatment of the unburned fuel in the exhaust gas 3, and arranged in the casing 8 and behind the selective reduction catalyst 6 is ammonia reducing catalyst 16 for oxidization treatment of the surplus ammonia; and arranged behind the casing 8 is an exhaust chamber 17 with its tail pipe directed rearward.

Further, as shown in FIG. 1, an accelerator pedal in a driver's cabin is provided with an accelerator sensor 18 (load sensor) for detection of an accelerator-pedal stamping degree as load on the diesel engine 1. The engine 1 is provided, at its appropriate position, with a revolution sensor 19 for detection of a revolution speed thereof. An accelerator-pedal stamping degree signal 18a and a revolution speed signal 19a from the accelerator sensor 18 and the revolution sensor 19, respectively, are input to a controller 20 as engine control computer (ECU: electronic control unit).

In the controller 20, depending upon present vehicle operational conditions judged from the signals 18a and 19a, a fuel injection signal 21a for command of fuel injection timing and amount is output to a fuel injection device 21 for injection of fuel into the respective cylinders.

The fuel injection device 21 is constituted by a plurality of injectors (not shown) each for each of the cylinders. An electromagnetic valve of each of the injectors is appropriately valve-opening controlled by the fuel injection signal 21a from the controller 20 to properly control fuel injection timing and amount (valve-opening time period).

In the embodiment, the controller 20 decides the fuel injection signal 21a for normal mode on the basis of the accelerator-pedal stamping degree signal 18a and the revolution speed signal 19a. When it becomes necessary to conduct forced regeneration of the particulate filter 5, changeover is made from normal mode to regeneration mode, and the fuel injection signal 21a is decided such that the main injection of fuel conducted near the compression upper dead center (crank angle 0°) is followed by post injection at non-ignition timing (commencing timing in the range of crank angle 90°-130°) after the compression upper dead center.

More specifically, in the illustrated embodiment, the fuel injection device 21 is applied as fuel addition means. The main injection is followed by the post injection at non-ignition timing after the compression upper dead center as mentioned in the above, unburned fuel (mainly hydrocarbon: HC) being added to the exhaust gas 3 by such post injection. The unburned fuel is oxidized during its passing through the oxidation catalyst 15 in front of the particulate filter 5, and inflow of the exhaust gas 3 elevated in temperature by the reaction heat of the oxidization into the particulate filter 5 arranged just behind elevates the catalyst floor temperature of the particulate filter 5 to burn off the particulates.

Extracted in the controller 20 are the revolution speed of the diesel engine 1 and the fuel injection amount derived from the output value of the fuel injection signal 21a. A basic particulate generation amount in the current operating condition of the diesel engine 1 is estimated depending upon these extracted data on the engine speed and the fuel injection amount, using a map of particulate generation amount. The estimated basic particulate generation amount is multiplied by a correction factor applied in consideration of various parameters on generation of the particulates and then an amount of the particulates burned off in the current engine operation state is subtracted therefrom to obtain a final particulate generation amount. Such final particulate generation amount is momentarily submitted to a cumulative computation to estimate an accumulated amount of the particulates. When the accumulated amount of the particulates thus estimated reaches a predetermined target value, switching is made from the normal mode to the regeneration mode so that the fuel is added to the exhaust gas 3 upstream of the particulate filter 5.

There have been various proposals for estimating such accumulated amount of the particulates; other methods than is illustrated above may be, of course, employed for estimation of the accumulated amount of the particulates. For example, the accumulated amount of the particulates may be estimated on the basis of differences in pressure before and after the particulate filter 5 or estimated in terms of operation time or travel distance.

In addition, estimated in the controller 20 is a generated amount of $NO_x$, on the basis of, for example, the revolution speed of the diesel engine 1 and the fuel injection amount. Addition of a required amount of urea water commensurate with the generated amount of $NO_x$, is commanded to the urea water addition injector 12 in the form of the valve-opening command signal 12a.

With the exhaust emission control device thus constructed, the particulates in the exhaust gas 3 are captured by the particulate filter 5, and at the upstream end 10a of the linear portion 10 downstream of the particulate filter, the urea water is added by the urea water addition injector 12 into the exhaust gas 3 and is hydrolyzed into ammonia and carbon dioxide gas. As a result, $NO_x$, in the exhaust gas 3 is depurated well on the selective reduction catalyst 6 through reduction by ammonia, thereby attaining concurrent reduction of the particulates and $NO_x$, in the exhaust gas 3.

In this case, in the flow passage of the exhaust gas 3 from the urea water addition means to the selective reduction catalyst 6, urea water collides against wall surfaces of the first and second bends 13 and 14 for refinement in liquid particle size of the urea water, so that the exhaust gas 3 is efficiently mixed with the urea water for facilitation of hydrolysis.

The urea water addition injector 12 (urea water addition means) is arranged at the upstream end of the longest linear portion 10 in the flow passage for guidance of the exhaust gas 3 from the particulate filter 5 to the selective reduction catalyst 6, the linear portion 10 having the length enough for obtaining mixing and reaction time for conversion of the urea water into ammonia, so that the urea water is reacted with the exhaust gas 3 in the linear portion 10.

When it becomes necessary to carry out forced regeneration of the particulate filter 5, the fuel injection control in the controller 19 is changed over from the normal mode to the regeneration mode. Fuel added at the diesel engine 1 by post injection is oxidized at the preceding oxidation catalyst 15, and inflow of the exhaust gas 3 elevated in temperature by the reaction heat of the oxidization into the particulate filter 5 arranged just behind elevates the catalyst floor temperature to burn off the particulates, thereby attaining the positive regeneration of the particulate filter 5.

Thus, according to the above embodiment, by forming at least a bend (two in the above embodiment; the first and second bends 13 and 14) in the flow passage for guidance of the exhaust gas 3 from the urea water addition injector 12 (urea water addition means) to the selective reduction catalyst 6, the urea water collides at the bend or bends for refinement in liquid particle size of the urea water so that the exhaust gas 3 is effectively mixed with the urea water, resulting in proper hydrolysis of the urea water into ammonia in the exhaust gas 3.

In the above embodiment, the urea water addition injector 12 (urea water addition means) is arranged at the upstream end of the longest linear portion 10 in the flow passage for guidance of the exhaust gas 3 from the particulate filter 5 to the selective reduction catalyst 6, the linear portion 10 having length enough for obtaining mixing and reaction time of the exhaust gas 3 for conversion of the urea water into ammonia. As a result, the urea water is mixed with the exhaust gas 3 in the linear portion 10 for beginning of conversion into ammonia. Further, the urea water not successively converted into ammonia is refined in liquid particle size by the bend or bends for acceleration of the reaction, whereby the reaction of the urea water with the exhaust gas 3 can be conducted more properly.

Further, in the above embodiment, the particulate filter 5 and the selective reduction catalyst 6 are arranged side by side, and the flow passage of the exhaust gas 3 comprises a first connection 9 where the exhaust gas 3 discharged from the rear of the particulate filter 5 is folded back, a linear portion 10 extending from the first connection 9 toward the front of the selective reduction catalyst 6 and a second connection 11 with first and second bends 13 and 14 for guidance from the linear portion 10 to the front of the selective reduction catalyst 6. Thus, the first and second bends 13 and 14 and the linear portion 10 can be properly constructed, so that the reaction of the urea water can be properly conducted to the exhaust gas 3. Since the particulate filter 5 and the selective reduction catalyst 6 are arranged side by side and the linear portion 10 is arranged between and along the particulate filter 5 and the selective reduction catalyst 6, the overall structure can be made compact in size.

The fuel added by the fuel injection device 21 in post injection is oxidized on the oxidation catalyst 15 and the inflow of the exhaust gas 3 elevated in temperature by reaction heat of the oxidization elevates the catalytic floor temperature of the particulate filter 5 arranged just behind to burn off the particulates, thereby attaining positive regeneration of the particulate filter 5.

Surplus ammonia having passed through the selective reduction catalyst 6 without reaction can be oxidized by the ammonia reducing catalyst 16 to become harmless. As a result, ammonia can be prevented from being left in the exhaust gas 3 to be finally discharged into the air.

It is to be understood that an exhaust emission control device of the invention is not limited to the above embodiment and that various changes and modifications may be made without departing from the scope of the invention. For example, in the above embodiment, the fuel injection device is applied as fuel addition means, and the fuel addition to the exhaust gas is conducted such that the main injection of fuel near the compression upper dead center is followed by post injection at non-ignition timing after the compression upper dead center. Alternatively, fuel addition to the exhaust gas may be conducted in the form of delaying the main injection to the cylinders than usual. Furthermore, in addition to such measure of fuel addition through control of the fuel injection into the cylinders to leave much unburned fuel in the exhaust gas, an injector as fuel addition means may be attached at an appropriate position on and extend into the exhaust pipe (or the exhaust manifold as alternative), fuel being added to the exhaust gas through direct injection by the injector.

The invention claimed is:

1. An exhaust emission control device, comprising:
a particulate filter incorporated in an exhaust pipe for capturing particulates in an exhaust gas;
a selective reduction catalyst downstream of said particulate filter and capable of selectively reacting $NO_x$ with ammonia even in the presence of oxygen; and
a flow passage for communication between the particulate filter and the selective reduction catalyst including
a first connection for folding-back of the exhaust gas discharged from an exit of the particulate filter;
a linear portion arranged between and along the particulate filter and the selective reduction catalyst for guidance of the exhaust gas from the first connection; and
a second connection for folding-back of the exhaust gas discharged from the linear portion to an inlet of the selective reduction catalyst; and
urea water addition means upstream of the second connection, the urea water addition means capable of adding urea water as a reducing agent between the particulate filter and the selective reduction catalyst, wherein:
the second connection includes a first bend curved at a tip of the linear portion where urea water in the exhaust gas collides against a first wall surface in a folded manner and a second bend curved at the first bend where urea water in the exhaust gas further collides against a second wall surface in a folded manner,
said particulate filter and said selective reduction catalyst are arranged side-by-side,
an axis of the particulate filter is substantially parallel to an axis of the linear portion of the flow passage for guidance of the exhaust gas from the particulate filter to the selective reduction catalyst, and
the axis of the particulate filter is spaced apart from the axis of the linear portion by a first distance.

2. The exhaust emission control device as claimed in claim 1, wherein
said urea water addition means is arranged at an upstream end of the linear portion of the flow passage for guidance of the exhaust gas from the particulate filter to the selective reduction catalyst, and
said linear portion has sufficient length for obtaining reaction time for conversion of the urea water into ammonia.

3. The exhaust emission control device as claimed in claim 2, further comprising:
an oxidation catalyst for oxidation treatment of unburned fuel in the exhaust gas arranged just upstream of the particulate filter; and
fuel addition means for addition of fuel in the exhaust gas being arranged upstream of said oxidation catalyst.

4. The exhaust emission control device as claimed in claim 3, wherein a fuel injection device for injecting fuel to respective cylinders of an engine is applied as fuel addition means, fuel injection to the cylinders being controlled to conduct fuel addition in the form of leaving much unburned fuel in the exhaust gas.

5. The exhaust emission control device as claimed in claim 4, further comprising:
an ammonia reducing catalyst for oxidation treatment of surplus ammonia arranged just downstream of the selective reduction catalyst.

6. The exhaust emission control device as claimed in claim 3, further comprising:
an ammonia reducing catalyst for oxidation treatment of surplus ammonia arranged just downstream of the selective reduction catalyst.

7. The exhaust emission control device as claimed in claim 2, further comprising:
an ammonia reducing catalyst for oxidation treatment of surplus ammonia arranged just downstream of the selective reduction catalyst.

8. The exhaust emission control device as claimed in claim 1, wherein:
the axis of the particulate filter is substantially parallel to an axis of the selective reduction catalyst, and
the axis of the particulate filter is spaced apart from the axis of the selective reduction catalyst by a second distance.

9. The exhaust emission control device as claimed in claim 8, wherein the second distance is greater than a sum of an outer radius of the particulate filter and an outer radius of the selective reduction catalyst.

10. The exhaust emission control device as claimed in claim 1, wherein the first distance is greater than a sum of an outer radius of the particulate filter and an outer radius of the linear portion.

11. An exhaust emission control device, comprising:
- a first casing disposed in an exhaust pipe, the first casing containing a particulate filter;
- a second casing disposed downstream of the first casing, the second casing containing a selective reduction catalyst; and
- a flow passage disposed downstream of the first casing and upstream of the second casing, the flow passage in fluid communication with both the first casing and the second casing, the flow passage including
  - a first connection coupled to an exit of the first casing;
  - a linear portion coupled to an exit of the first connection;
  - a second connection coupled to an exit of the linear portion and coupled to an inlet of the second casing, and
  - a urea water injector upstream of the second connection, wherein:
- the second connection includes a first bend upstream of a second bend,
- the first bend includes a first wall surface arranged substantially perpendicular to an axis of the linear portion, such that urea water exiting the linear portion collides against the first wall surface in a folded manner, and
- the second bend includes a second wall surface arranged substantially perpendicular to the first wall surface, such that urea water exiting the first bend collides against the second wall surface in a folded manner,
- an axis of the first casing is substantially parallel to an axis of the linear portion,
- the axis of the first casing is spaced apart from the axis of the linear portion by a first distance,
- the first distance is greater than a sum of an outer radius of the first casing and an outer radius of the linear portion, and
- an axial length of the first casing is arranged substantially alongside an axial length of the linear portion.

12. The exhaust emission control device as claimed in claim 11, wherein:
- the axis of the first casing is substantially parallel to an axis of the second casing,
- the axis of the first casing is spaced apart from the axis of the second casing by a second distance,
- the second distance is greater than a sum of the outer radius of the first casing and an outer radius of the second casing, and
- the axial length of the first casing is arranged substantially alongside an axial length of the second casing.

13. The exhaust emission control device as claimed in claim 11, wherein the urea water injector is disposed downstream of the particulate filter.

14. The exhaust emission control device as claimed in claim 13, wherein the urea water injector is disposed upstream of the linear portion.

* * * * *